(12) United States Patent
Noll (10) Patent No.: US 11,425,860 B2
(45) Date of Patent: Aug. 30, 2022

(54) AUGER AND DRIVE ASSEMBLY FOR AN AGRICULTURAL HARVESTER HEADER

(71) Applicant: CNH Industrial America LLC, New Holland, PA (US)

(72) Inventor: Blaine R. Noll, Fleetwood, PA (US)

(73) Assignee: CNH Industrial America LLC, New Holland, PA (US)

( * ) Notice: Subject to any disclaimer, the term of this patent is extended or adjusted under 35 U.S.C. 154(b) by 133 days.

(21) Appl. No.: 16/660,074

(22) Filed: Oct. 22, 2019

(65) Prior Publication Data

US 2021/0112717 A1 Apr. 22, 2021

(51) Int. Cl.
| | | |
|---|---|---|
| *A01D 41/14* | (2006.01) | |
| *A01D 61/00* | (2006.01) | |
| *A01D 47/00* | (2006.01) | |
| *B65G 33/34* | (2006.01) | |

(52) U.S. Cl.
CPC .......... *A01D 41/142* (2013.01); *A01D 47/00* (2013.01); *A01D 61/004* (2013.01); *B65G 33/34* (2013.01)

(58) Field of Classification Search
CPC .... A01D 41/142; A01D 47/00; A01D 61/004; A01D 61/008; B65G 33/34; B65G 33/26; B65G 2812/0505
USPC .......................................................... 56/14.5
See application file for complete search history.

(56) References Cited

U.S. PATENT DOCUMENTS

| | | | | |
|---|---|---|---|---|
| 992,513 | A * | 5/1911 | McAnulty et al. | B65B 1/32 177/54 |
| 2,464,919 | A * | 3/1949 | Carroll | A01D 61/008 56/158 |
| 2,711,244 | A * | 6/1955 | Hyman | A01D 61/008 198/522 |
| 3,272,480 | A * | 9/1966 | Sukup | A01F 25/08 366/261 |
| 3,379,301 | A * | 4/1968 | Kopaska | B65G 33/34 198/667 |
| 4,029,237 | A * | 6/1977 | Miconi | E01C 19/2035 222/614 |
| 4,174,072 | A * | 11/1979 | Kline | B02C 21/00 241/101.8 |
| 4,552,462 | A * | 11/1985 | Schnell | B01F 27/95 366/280 |
| 5,335,619 | A * | 8/1994 | Pollock | B65G 19/16 119/57.4 |

(Continued)

FOREIGN PATENT DOCUMENTS

| | | |
|---|---|---|
| CN | 2709397 Y | 7/2005 |
| CN | 101774478 A * | 7/2010 |

(Continued)

*Primary Examiner* — Alicia Torres
*Assistant Examiner* — Matthew Ian Neal
(74) *Attorney, Agent, or Firm* — Peter Zacharias; Patrick Sheldrake (57) ABSTRACT

A header for an agricultural harvester comprising a chassis and an auger having a tube extending in end to end relation with and rotatably supported by the chassis. The header further includes a drive mounted adjacent a mid-portion of the auger and operatively engaged with the mid-portion of the auger for driving rotation thereof. The header thus provides an auger which is driven at its mid-portion, thereby eliminating the hydraulic complexities of augers that are driven at their ends. In addition, when the auger tube is continuous, the mid-portion driven, continuous tube auger eliminates the crop dead spot that typically occurs when split augers are deployed.

15 Claims, 8 Drawing Sheets

(56) References Cited

U.S. PATENT DOCUMENTS

| | | | | |
|---|---|---|---|---|
| 5,639,200 | A | * | 6/1997 | Jiskoot ................ B65G 65/466 414/312 |
| 6,564,535 | B1 | * | 5/2003 | Nafziger ............. A01D 61/008 198/666 |
| 7,234,291 | B2 | * | 6/2007 | Rickert ................. A01D 69/00 56/209 |
| 7,810,303 | B2 | * | 10/2010 | Goguelet ............... A01D 34/67 56/255 |
| 9,072,222 | B2 | * | 7/2015 | Bomleny ............. A01D 41/144 |
| 9,814,181 | B2 | | 11/2017 | Wenger et al. |
| 9,913,430 | B2 | | 3/2018 | Cook et al. |
| 2002/0134336 | A1 | * | 9/2002 | Duesmann ............. F01L 1/024 123/90.31 |
| 2003/0060320 | A1 | * | 3/2003 | Woodcock ............. F16H 3/145 475/230 |
| 2008/0100123 | A1 | * | 5/2008 | In 'T Hout ............ B65G 33/34 299/18 |
| 2008/0256920 | A1 | * | 10/2008 | Yanke .................. A01D 43/105 56/157 |
| 2008/0295474 | A1 | * | 12/2008 | Tippery ................. A01D 57/20 56/14.5 |
| 2012/0076541 | A1 | * | 3/2012 | Bucks ............... G03G 15/0891 399/256 |
| 2019/0029181 | A1 | * | 1/2019 | Modak ................. A01D 41/142 |
| 2019/0045709 | A1 | | 2/2019 | Schroeder et al. |
| 2021/0092902 | A1 | * | 4/2021 | Kumar ................. A01D 61/004 |

FOREIGN PATENT DOCUMENTS

| | | | | |
|---|---|---|---|---|
| CN | 202222157 | U | | 5/2012 |
| CN | 203002641 | U | | 6/2013 |
| CN | 207450944 | U | * | 6/2018 |
| CN | 209156142 | U | * | 7/2019 |
| DE | 4244220 | A1 | * | 6/1994 ............. B65G 33/02 |
| IT | 1164434 | B | * | 4/1987 ........... G01N 27/043 |
| JP | 3463773 | B2 | * | 11/2003 |

* cited by examiner

AUGER AND DRIVE ASSEMBLY FOR AN AGRICULTURAL HARVESTER HEADER

The exemplary embodiments of present invention relate generally to a header of a plant cutting machine (e.g., a combine harvester) and, more specifically, to a header having a drive engaging and driving an auger about its mid-portion.

BACKGROUND OF THE INVENTION

An agricultural harvester e.g., a plant cutting machine, such as, but not limited to, a combine or a windrower, generally includes a header operable for severing and collecting plant or crop material as the harvester is driven over a crop field. The header has a plant cutting mechanism, e.g., a cutter bar, for severing the plants or crops via, for example, an elongate sickle mechanism that reciprocates sidewardly relative to a non-reciprocating guard structure. After crops are cut, they are collected inside the header and transported via a conveyor such as an auger towards a feederhouse located centrally inside the header.

Conventional agricultural harvester header augers are typically driven from the end of the auger or the center of the auger. When driving the auger from the end, multiple hydraulic assemblies are required for various header sizes which creates complexity for engineering, manufacturing and service. In the alternative, when driving from the center of the auger, the auger is split and driven from the center. With center driven augers, the issue of hydraulic complexity is resolved, however, the split in the auger creates a dead spot for the cut crop whereby the crop is unable to be effectively compressed and conveyed by the auger.

SUMMARY OF THE INVENTION

In accordance with an exemplary embodiment there is provided a header for an agricultural harvester comprising a chassis and an auger having a tube extending in end to end relation with and rotatably supported by the chassis. The header further includes a drive mounted adjacent a mid-portion of the auger and operatively engaged with the mid-portion of the auger for driving rotation thereof.

An aspect of the exemplary embodiment is that the drive comprises a drive motor and a drive wheel driven by the drive motor, wherein the drive wheel directly engages the auger for driving rotation thereof. In accordance with another aspect, the drive frictionally engages the auger for driving rotation therewith. Another aspect of the exemplary embodiment is that the auger includes a radially projecting annular flange about its mid-portion operatively engaged with the drive.

In accordance with the exemplary embodiments, there is provided an auger having a tube that is rotated by a drive mounted adjacent a mid-portion of the auger. When the subject disclosure is used in combination with an agricultural harvester, the disclosure overcomes the disadvantages referenced above by providing an auger which is driven at its mid-portion, thereby eliminating the hydraulic complexities of augers that are driven at their ends. In addition, when the auger has a continuous tube, the mid-portion driven, continuous tube auger eliminates the crop dead spot that typically occurs when split augers are deployed.

Other features and advantages of the subject disclosure will be apparent from the following more detail description of the exemplary embodiments.

BRIEF DESCRIPTION OF THE DRAWINGS

The foregoing summary, as well as the following detailed description of the exemplary embodiments of the subject disclosure, will be better understood when read in conjunction with the appended drawings. For the purpose of illustrating the present disclosure, there are shown in the drawings exemplary embodiments. It should be understood, however, that the subject application is not limited to the precise arrangements and instrumentalities shown.

DETAILED DESCRIPTION OF THE DRAWINGS

Reference will now be made in detail to the various exemplary embodiments of the subject disclosure illustrated in the accompanying drawings. Wherever possible, the same or like reference numbers will be used throughout the drawings to refer to the same or like features. It should be noted that the drawings are in simplified form and are not drawn to precise scale. Certain terminology is used in the following description for convenience only and is not limiting. Directional terms such as top, bottom, left, right, above, below and diagonal, are used with respect to the accompanying drawings. The term "distal" shall mean away from the center of a body. The term "proximal" shall mean closer towards the center of a body and/or away from the "distal" end. The words "inwardly" and "outwardly" refer to directions toward and away from, respectively, the geometric center of the identified element and designated parts thereof. Such directional terms used in conjunction with the following description of the drawings should not be construed to limit the scope of the subject application in any manner not explicitly set forth. Additionally, the term "a," as used in the specification, means "at least one." The terminology includes the words above specifically mentioned, derivatives thereof, and words of similar import.

The terms "grain," "ear," "stalk," "leaf," and "crop material" are used throughout the specification for convenience and it should be understood that these terms are not intended to be limiting. Thus, "grain" refers to that part of a crop which is harvested and separated from discardable portions of the crop material. The header of the subject application is applicable to a variety of crops, including but not limited to wheat, soybeans and small grains. The terms "debris," "material other than grain," and the like are used interchangeably.

"About" as used herein when referring to a measurable value such as an amount, a temporal duration, and the like, is meant to encompass variations of ±20%, ±10%, ±5%, ±1%, or ±0.1% from the specified value, as such variations are appropriate.

"Substantially" as used herein shall mean considerable in extent, largely but not wholly that which is specified, or an appropriate variation therefrom as is acceptable within the field of art.

Throughout the subject application, various aspects thereof can be presented in a range format. It should be understood that the description in range format is merely for convenience and brevity and should not be construed as an inflexible limitation on the scope of the subject disclosure. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 2.7, 3, 4, 5, 5.3, and 6. This applies regardless of the breadth of the range.

Furthermore, the described features, advantages and characteristics of the exemplary embodiments of the subject disclosure may be combined in any suitable manner in one or more embodiments. One skilled in the relevant art will recognize, in light of the description herein, that the subject disclosure can be practiced without one or more of the specific features or advantages of a particular exemplary embodiment. In other instances, additional features and advantages may be recognized in certain embodiments that may not be present in all exemplary embodiments of the present disclosure.

Figure 1:
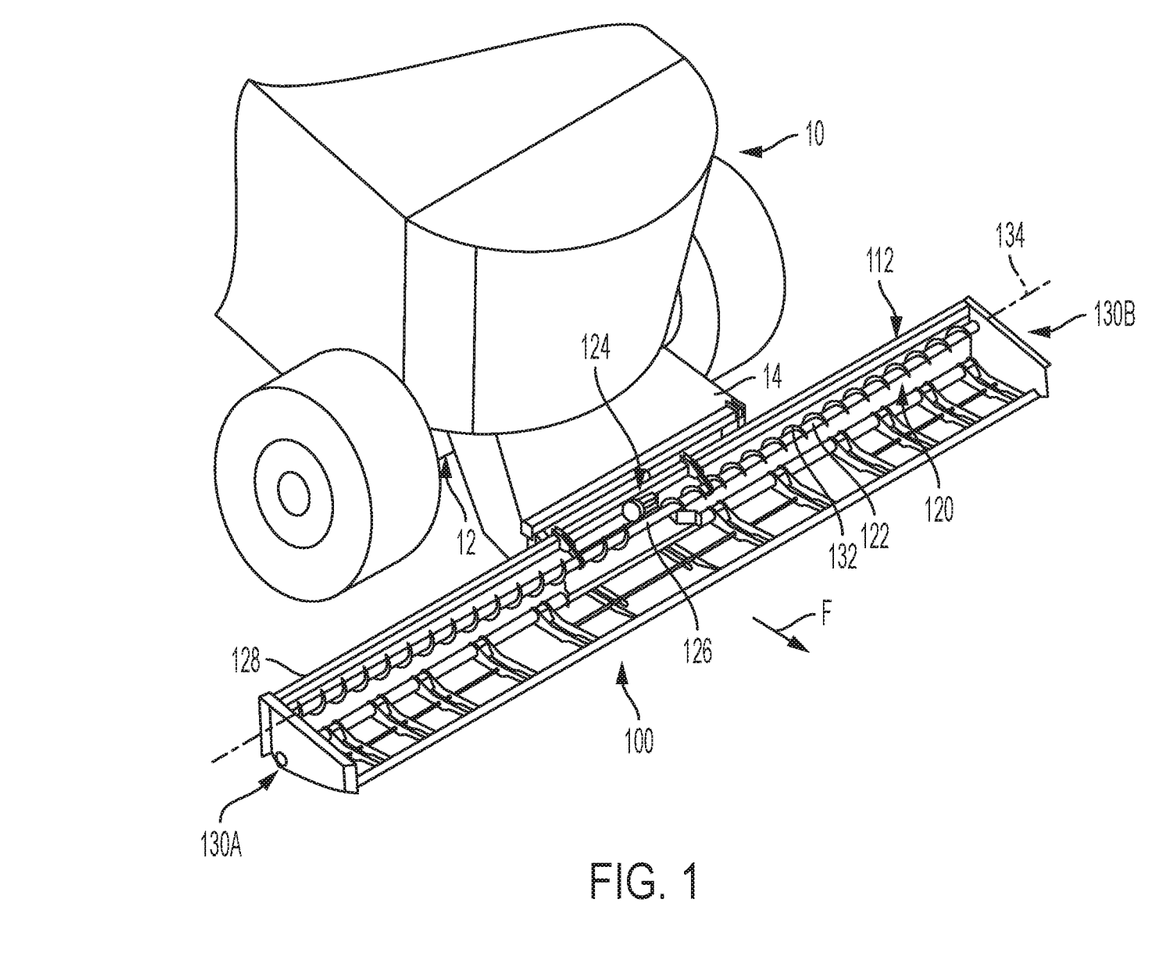
FIG. 1 is a front perspective view of an agricultural harvester including a header in accordance with an exemplary embodiment of the subject disclosure.

Referring now to the drawings, and more particularly to FIG. 1, there is shown an exemplary embodiment of an agricultural vehicle 10 in the form of a combine harvester which generally includes a chassis 12, and a feeder housing or feederhouse 14. Typically, the combine harvester 10 will include additional internal systems for the separation and handling of collected crop material. However, these additional systems are not essential for a full understanding of the subject disclosure. It should be appreciated that the auger described and illustrated herein does not necessarily need to be included on headers for combine harvesters, but can be incorporated in other types of agricultural vehicles or devices having similar uses for such augers.

The agricultural harvester includes an attachment in the form of a header 100 with a chassis 112 rotatably supporting an auger 120. In the exemplary embodiment, the auger 120 has a continuous tube 122 extending in substantially end to end relation or in end to end relation with the chassis 112. It is to be understood that tube 122 need not be continuous. That is, the tube can be sectional or segmented and connected with shafts and/or universal joints in order to enable relative motion between adjacent segments of the auger. The header 100 further includes a drive 124 mounted adjacent a mid-portion 126 of the auger and operatively engaged with the mid-portion of the auger for driving rotation thereof.

The header 100 is coupled to the feeder housing 14 and supported by the chassis 12 of the agricultural vehicle 10. The header chassis 112 has a top support beam 128 extending transversely across the length of the header and a pair of opposed lateral ends 130A, 130B. While illustrated as continuous, the top beam 128 can be, like the auger tube 122, sectional in construction. The header 100 may include a rotating reel with tines or the like to sweep the crop material inwardly, e.g., a windrower, or may alternatively be configured as a corn header with a plurality of row units. The header 100 may also support one or more cutter bars to cut crop material as the agricultural vehicle 10 travels in a forward direction, denoted by arrow F.

The auger tube 122, whether a continuous tube or a sectional tube, extends an entire width of the auger. The auger also includes flighting 132 on the auger tube and an axis of rotation 134 about which the auger 120 rotates about when engaging the crop material. The flighting 132 of the auger may include left and right fighting that extends substantially to the mid-portion of the header or adjacent an infeed conveyor of the header. The fighting may also be configured to not extend across the center of the header 100. In other words, the auger can be configured to include a non-flighted mid-portion 126.

Figure 2:
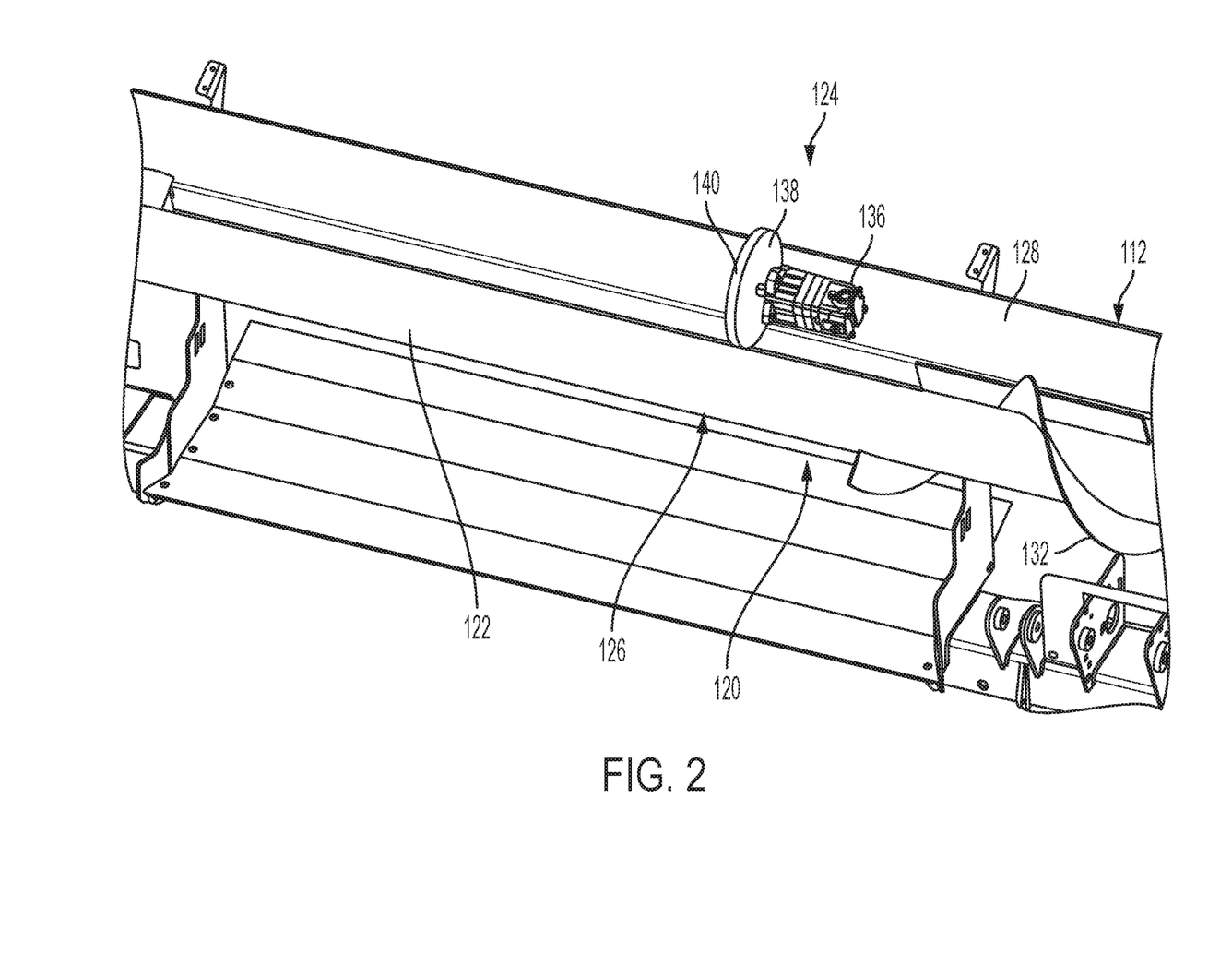
FIG. 2 is an enlarged partial perspective view of an agricultural harvester header including a mid-portion driven auger in accordance with an exemplary embodiment of the subject disclosure.
Figure 3:
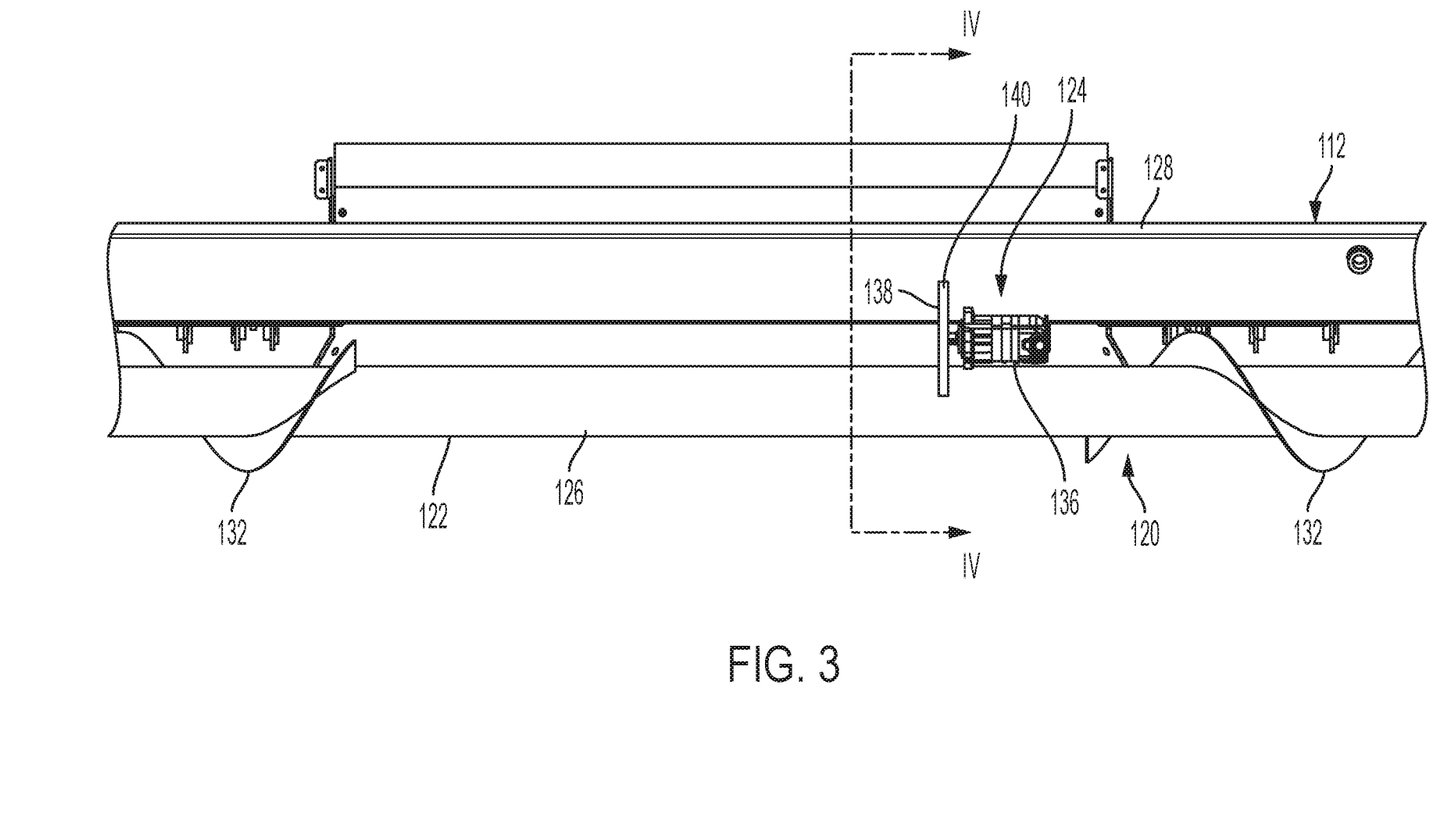
FIG. 3 is a top partial view of the agricultural harvester header of FIG. 2.
Figure 4:
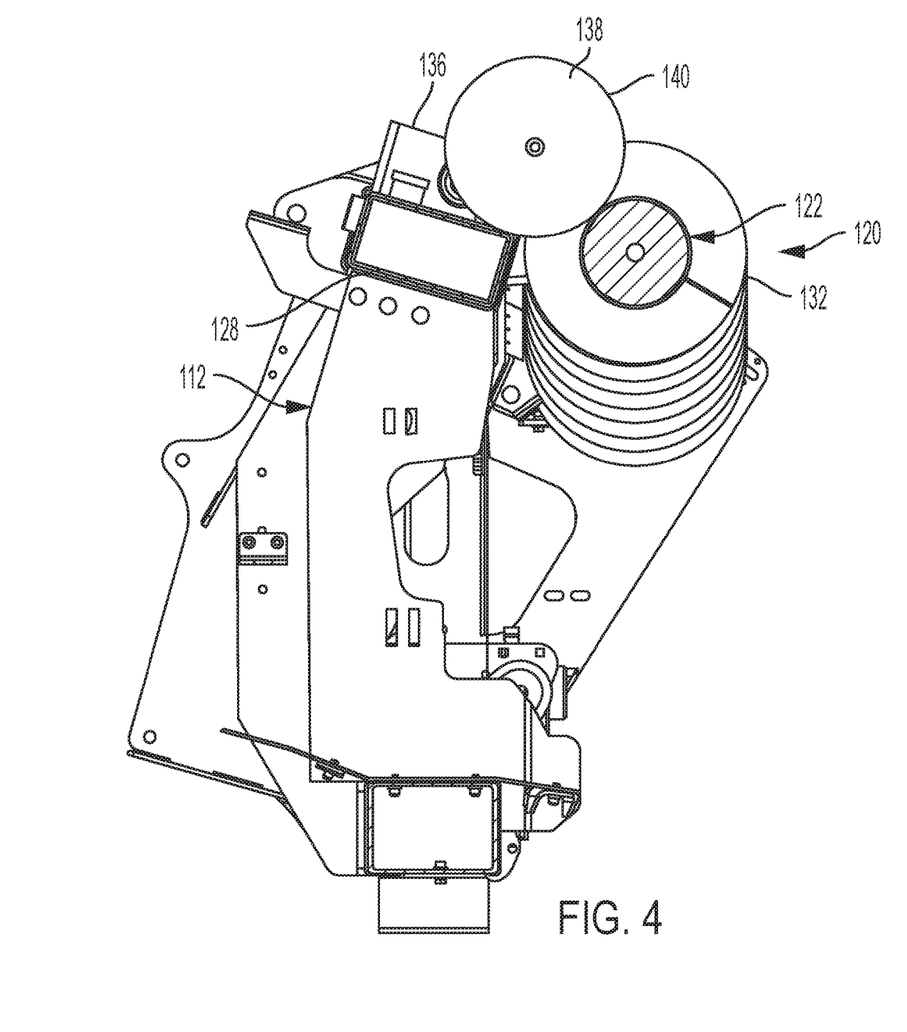
FIG. 4 is a cross-sectional view of the agricultural harvester header in accordance with an exemplary embodiment of the subject disclosure taken along line IV-IV of FIG. 3.

Referring to FIGS. 2-4, there is shown on an enlarged scale, the auger 120, auger tube 122 and drive 124 constructed in accordance with a first exemplary embodiment of the subject disclosure. The drive 124 directly engages the non-flighted mid-portion 126 of the auger. In particular, the drive 124 frictionally engages the auger 120 for driving rotation therewith. More particularly, the drive engages an outer surface of the auger, e.g., an outer or outside surface of the auger tube. The drive 124 comprises a drive motor 136 mounted to the header chassis 112. In the illustrated embodiment, the drive motor is mounted to the top support beam 128 adjacent the mid-portion 126 of the auger 120.

In accordance with an exemplary embodiment, the drive 124 comprises a drive wheel 138 driven by the drive motor 136. Specifically, the drive wheel directly engages an outer surface of the auger, e.g., the outer surface of the auger tube. The drive wheel directly engages the auger 120 for driving rotation thereof. The drive motor 136 may be a hydraulic motor, an electric motor, a mechanical motor and/or the like.

According to an aspect, the drive wheel 138 includes a high friction periphery 140 that directly engages the auger tube 122. The high friction periphery may comprise any suitable high friction material including, without limitation, a polymer, e.g., an elastomer or rubber.

Figure 5:
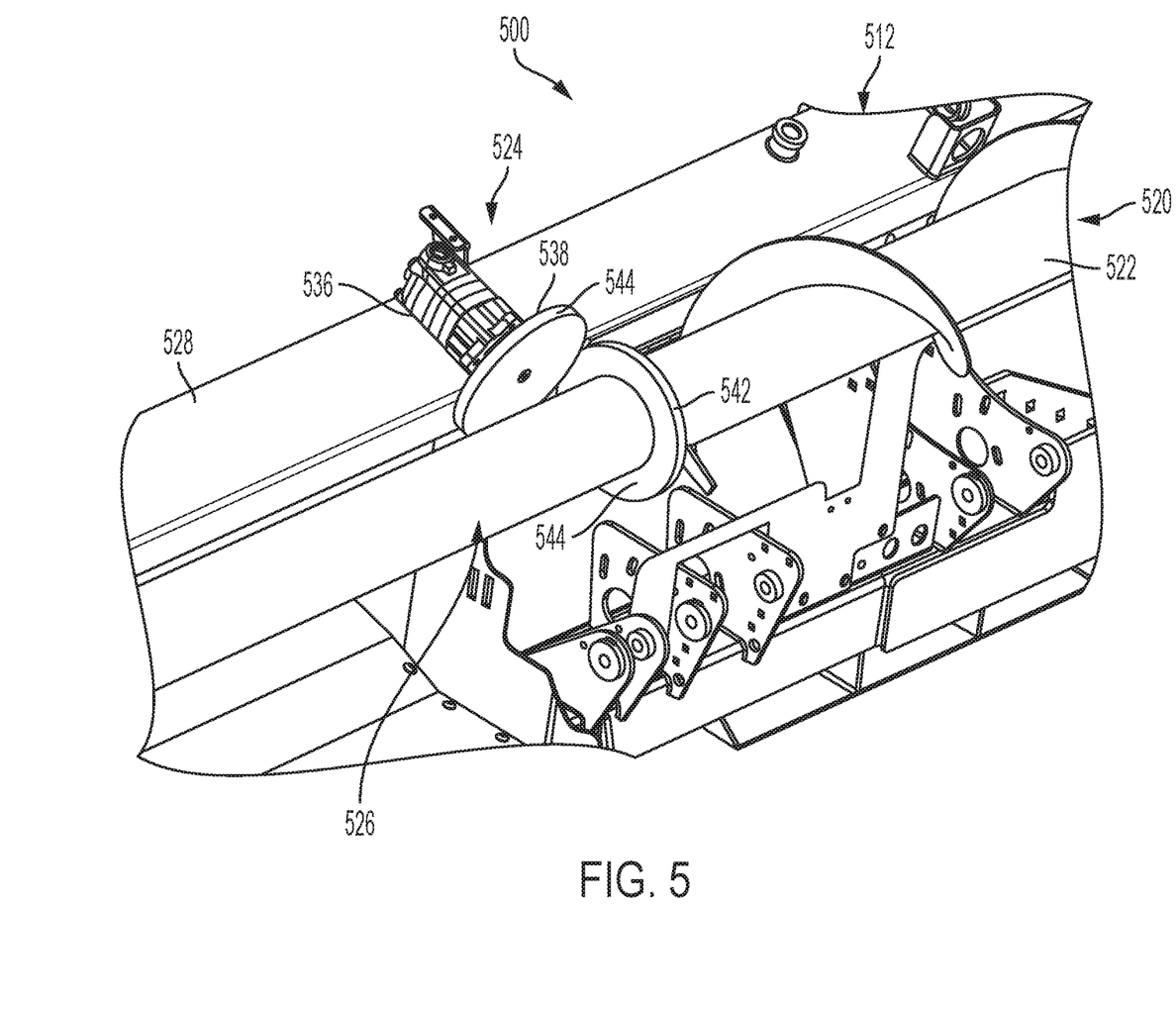
FIG. 5 is an enlarged partial perspective view of an agricultural harvester header including a mid-portion driven auger in accordance with another exemplary embodiment of the subject disclosure.

Referring to FIG. 5, there is shown on an enlarged scale another exemplary embodiment of a header 500 constructed in accordance with the subject disclosure. Header 500 includes an auger 520 having a tube 522 extending in end to end relation with and rotatably supported by a chassis 512. The auger 520 includes a radially projecting annular flange 542 about a mid-portion of 526 of the auger, which is operatively engaged with a drive 524. The annular flange is rigidly attached to the tube so as to rotate therewith.

The drive 524 directly engages the radially projecting annular flange 542. In an exemplary aspect, the drive 524 comprises a drive motor 536 mounted to the header chassis 512. In the illustrated embodiment, the drive motor is mounted to a top support beam 528 of the chassis adjacent the mid-portion 526 of the auger 520. The drive 524 further comprises a drive wheel 538 driven by the drive motor 536. The drive wheel is positioned to rotate about an axis that is substantially perpendicular to the auger tube and the radially projecting outer flange. The drive wheel directly engages the radially projecting annular flange 542 for driving rotation of the auger 520, specifically a side of the radially projecting outer flange. In order to enhance contact between the drive wheel 538 and the radially projecting annular flange 542, either or both of the drive wheel and the radially projecting annular flange may comprise a high friction surface 544 about its outer surface, such as a polymer, e.g., an elastomer or rubber.

Figure 6:
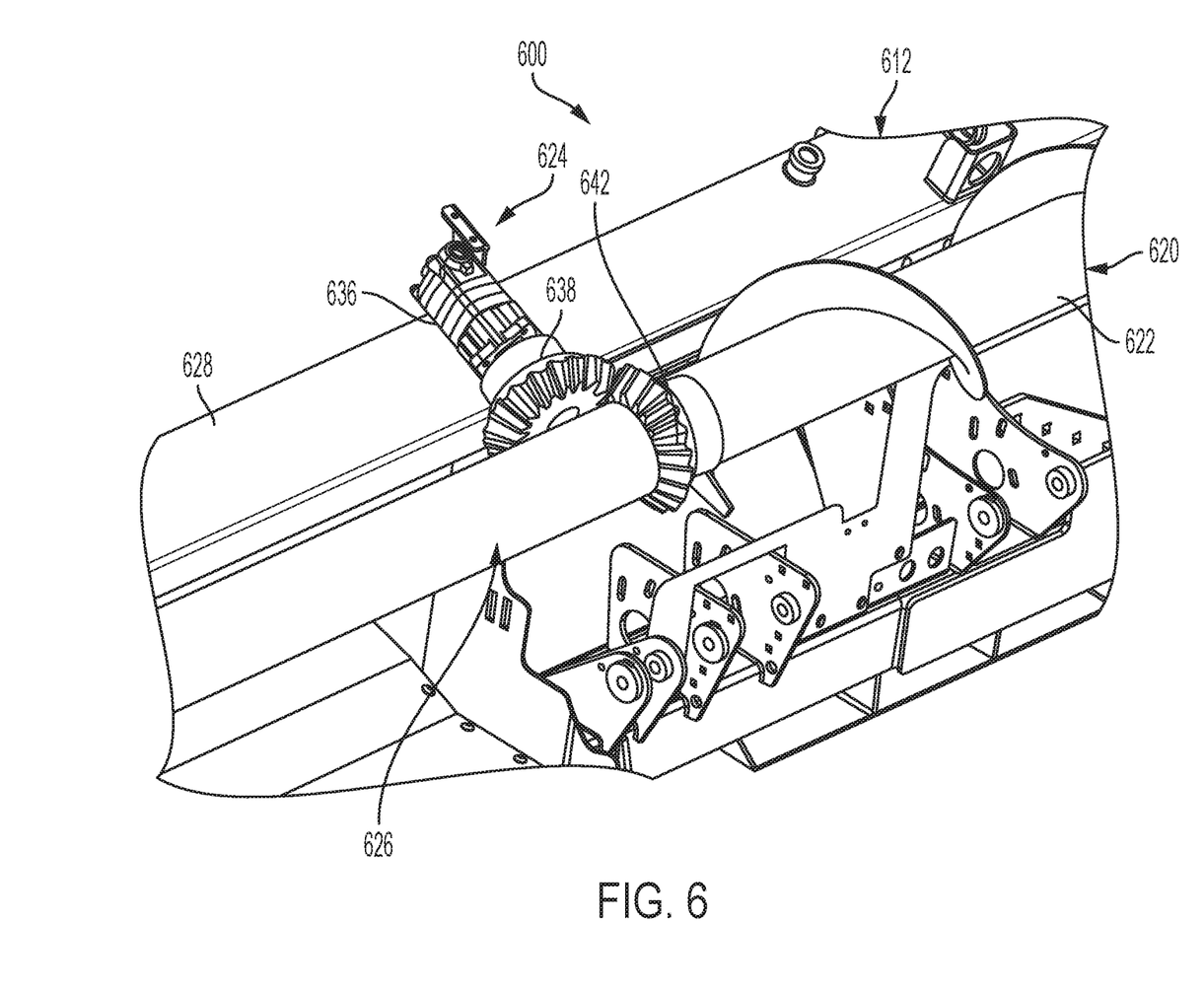
FIG. 6 is an enlarged partial perspective view of an agricultural harvester header including a mid-portion driven auger in accordance with another exemplary embodiment of the subject disclosure.

Referring to FIG. 6, there is shown on an enlarged scale a further exemplary embodiment of a header 600 constructed in accordance with the subject disclosure. Header 600 includes an auger 620 having a tube 622 extending in end to end relation with and rotatably supported by a chassis 612. The auger 620 includes a radially projecting annular flange 642 configured as a gear about a mid-portion of 626 of the auger which is operatively engaged with a drive 624. According to an aspect, the drive 624 directly engages the radially projecting annular flange 642. The drive 624 comprises a drive motor 636 mounted to the header chassis 612. In the illustrated embodiment, the drive motor is mounted to a top support beam 628 of the chassis adjacent the mid-portion 626 of the auger 620. The drive 624 further comprises a drive wheel gear 638 driven by the drive motor 636. The drive wheel gear directly engages the radially projecting annular gear 642 for driving rotation of the auger 620.

It will be understood that while the illustrated example of FIG. 6 shows a bevel gear set 638, 642, other gear-to-gear arrangements may be used to drive the auger 620. By way of example, but not limitation, the annular gear which radially projects from the auger 620 can be a straight cut spur gear. Likewise, the drive motor 636 can be oriented parallel to the auger tube 622 and drive a straight cut spur gear which engages and drives the spur gear that radially projects from the auger.

Figure 7:
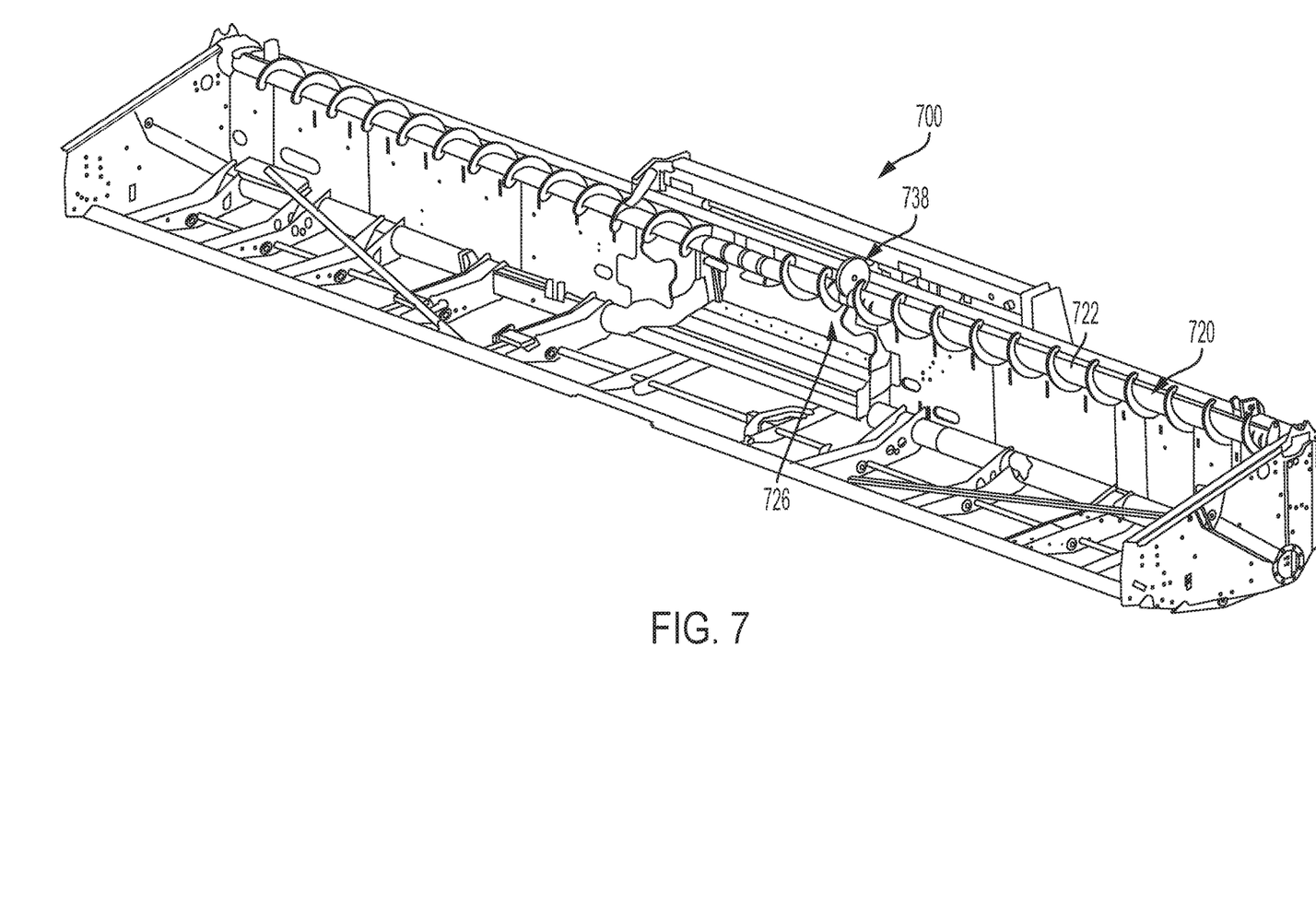
FIG. 7 is a perspective view of an agricultural harvester header including a mid-portion driven auger in accordance with yet another exemplary embodiment of the subject disclosure.
Figure 8:
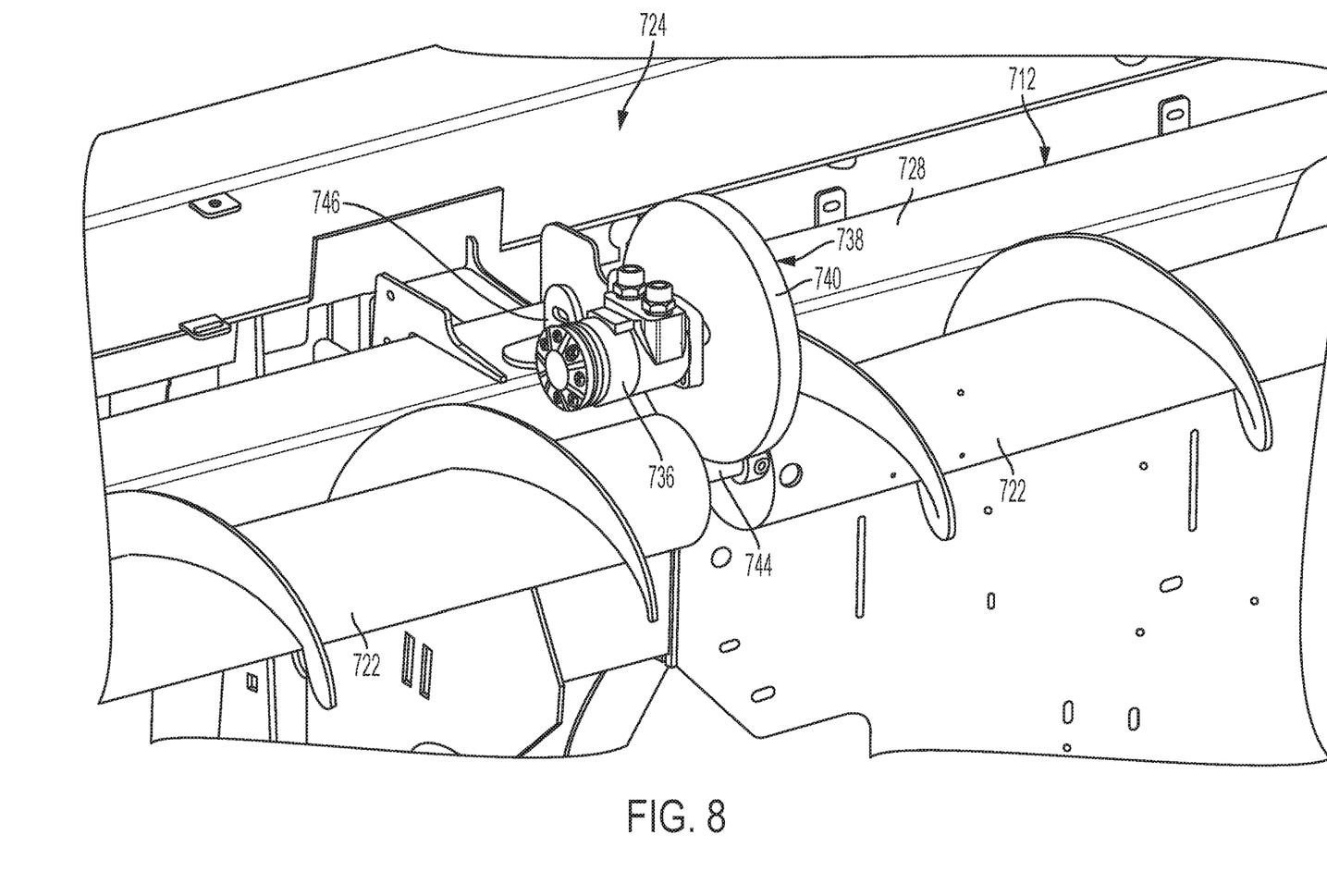
FIG. 8 an enlarged partial perspective view of the agricultural harvester header of FIG. 7.

Referring to FIGS. 7 and 8, there is shown a further exemplary embodiment of a header 700 constructed in accordance with the subject disclosure. Header 700 is constructed similar to header 100. Accordingly, only those aspects of the header 700 that depart materially in structure and/or function from their counterparts in header 100, or are otherwise necessary for a proper understanding of the subject disclosure, will be discussed in detail.

As shown in FIGS. 7 and 8, an auger 720, an auger tube 722 and a drive 724 are constructed in accordance with another exemplary embodiment of the subject disclosure. The drive 724 directly engages the non-flighted mid-portion 726 of the auger. In particular, the drive 724 frictionally engages the auger 720 for driving rotation therewith. More particularly, the drive engages an outer surface of an auger shaft 744 that couples adjacent segments or sections of the auger tube 722. The drive 724 comprises a drive motor 736 mounted by suitable mounting structure 746 to the header chassis 712. In the illustrated embodiment, the drive motor is mounted to the top support beam 728 adjacent the mid-portion 726 of the auger 720.

The drive 724 comprises a drive wheel 738 driven by the drive motor 736. The drive wheel 738 directly engages the auger shaft 744 for driving rotation thereof. Similar to earlier disclosed embodiments, the drive motor 736 may be a hydraulic motor, an electric motor, a mechanical motor and/or the like. According to an aspect, the drive wheel 738 includes a high friction periphery 740 that directly engages the auger shaft 744. The high friction periphery may comprise any suitable high friction material including, without limitation, a polymer, e.g., an elastomer or rubber. In the alternative, and similar to that described above in connection with FIG. 6, the drive wheel 738 can be constructed as a gear that engages a corresponding gear provided on the auger shaft 744.

The headers according to the subject disclosure thus provide an auger which is driven at its mid-portion, thereby eliminating the hydraulic complexities of augers that are driven at their ends. In addition, when the auger tube is continuous, the mid-portion driven, continuous tube auger eliminates the crop dead spot that typically occurs when split augers are deployed.

It will be appreciated by those skilled in the art that changes could be made to the exemplary embodiments described above without departing from the broad inventive concept thereof. It is to be understood, therefore, that this disclosure is not limited to the particular embodiments disclosed, but it is intended to cover modifications within the spirit and scope of the subject disclosure as defined by the appended claims.

I claim:

1. A header for an agricultural harvester comprising:
a chassis;
an auger having a continuous tube extending in end to end relation with and rotatably supported by the chassis and flights extending from the continuous tube; and
a drive including a friction drive wheel mounted adjacent a mid-portion of the auger, and
wherein the friction drive wheel directly engages the continuous tube for driving rotation of the auger.

2. The header of claim 1, wherein the drive further comprises:
a drive motor for driving the friction drive wheel.

3. The header of claim 1, wherein the friction drive wheel includes a high friction periphery sufficient to directly engage and drive the continuous tube.

4. The header of claim 3, wherein the high friction periphery comprises a polymer.

5. The header of claim 1, wherein the drive frictionally engages the auger for driving rotation therewith.

6. The header of claim 1, wherein the auger includes a non-flighted mid-portion and the drive directly engages the non-flighted mid-portion of the auger.

7. The header of claim 1, wherein the drive includes a hydraulic motor, an electric motor and/or a mechanical motor.

8. The header of claim 1, wherein the auger includes a radially projecting annular flange about its mid-portion operatively engaged with the drive.

9. The header of claim 8, wherein the radially projecting annular flange comprises a high friction surface sufficient to engage the drive for rotating the auger.

10. The header of claim 8, wherein the drive directly engages the radially projecting annular flange.

11. The header of claim 8, wherein the drive comprises:
a drive motor; and
a drive wheel driven by the drive motor, wherein the drive wheel directly engages the radially projecting annular flange for driving rotation of the auger.

12. The header of claim 8, wherein the radially projecting annular flange is a gear.

13. The header of claim 12, wherein the drive comprises a drive wheel gear.

14. The header of claim 1, wherein the drive engages an outside surface of the continuous tube.

15. The header of claim 1, wherein the drive directly engages an outside surface of the continuous tube.

* * * * *